United States Patent
Bibow

(12) United States Patent (10) Patent No.: US 7,588,276 B1
(45) Date of Patent: Sep. 15, 2009

(54) TANK HANDLE SYSTEM

(76) Inventor: Christopher W. Bibow, 14 Morrill Pl., Huntington, NY (US) 11743

(*) Notice: Subject to any disclaimer, the term of this patent is extended or adjusted under 35 U.S.C. 154(b) by 598 days.

(21) Appl. No.: 11/028,368

(22) Filed: Jan. 3, 2005

Related U.S. Application Data

(60) Provisional application No. 60/553,079, filed on Mar. 13, 2004, provisional application No. 60/576,494, filed on Jun. 3, 2004, provisional application No. 60/580,980, filed on Jun. 17, 2004, provisional application No. 60/584,724, filed on Jul. 1, 2004, provisional application No. 60/588,915, filed on Jul. 17, 2004, provisional application No. 60/618,347, filed on Oct. 12, 2004.

(51) Int. Cl.
B65G 7/12 (2006.01)
F17C 13/04 (2006.01)
(52) U.S. Cl. .................. 294/137; 294/2; 137/382
(58) Field of Classification Search ............ 294/137, 294/2, 151; 137/355.16, 382, 355; 248/79, 248/90; 220/724
See application file for complete search history.

(56) References Cited

U.S. PATENT DOCUMENTS

| 1,563,000 | A  | * | 11/1925 | Wajer et al. ............... 294/169 |
| 5,186,391 | A  | * | 2/1993  | Roueche et al. ............ 239/373 |
| 6,213,529 | B1 | * | 4/2001  | Kurcz et al. ............... 294/143 |
| 6,536,820 | B1 | * | 3/2003  | Dean et al. ................ 294/170 |
| 6,976,490 | B2 | * | 12/2005 | Joachimsthaler et al. ........... 128/204.26 |
| 7,089,956 | B1 | * | 8/2006  | Davidson et al. ........... 137/382 |
| 7,195,031 | B2 | * | 3/2007  | Trettin et al. ............ 137/355.16 |
| 2003/0098315 | A1 | * | 5/2003 | Lacy ...................... 222/1 |
| 2005/0001440 | A1 | * | 1/2005 | Hartwell .................. 294/137 |

* cited by examiner

Primary Examiner—Paul T Chin
(74) Attorney, Agent, or Firm—Edward P Dutkiewicz

(57) ABSTRACT

An upper section being configured to be held by a user. The upper portion has opposed ends and a downward portion. The upper portion and downward portion are in a common vertical plane during operation and use. A lower section has a lower portion configured to receive a cylindrical neck of a tank to be lifted and transported. A central section has a connecting portion having an upper end and a lower end.

3 Claims, 13 Drawing Sheets

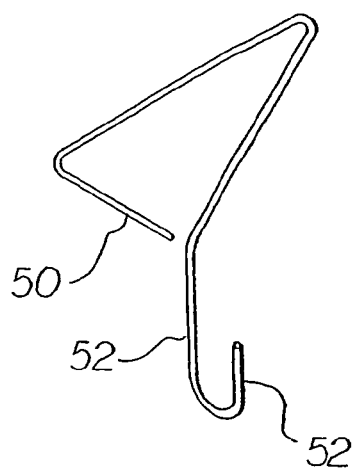
FIG 3
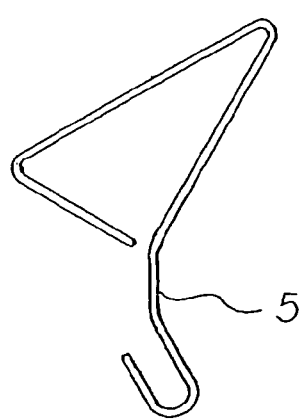
FIG 4
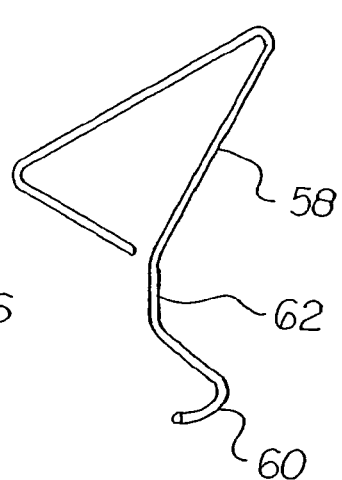
FIG 5
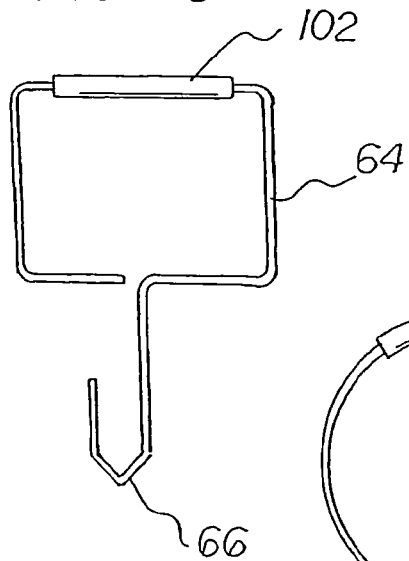
FIG 6
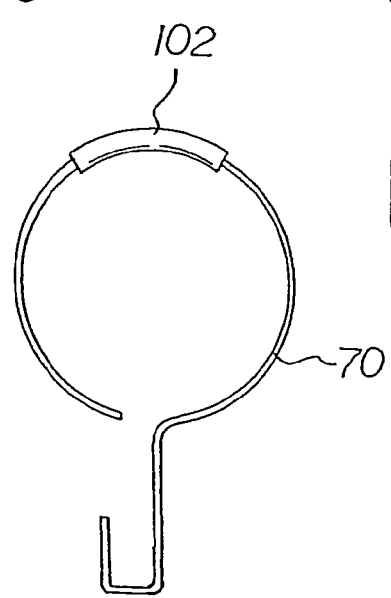
FIG 8
FIG 7

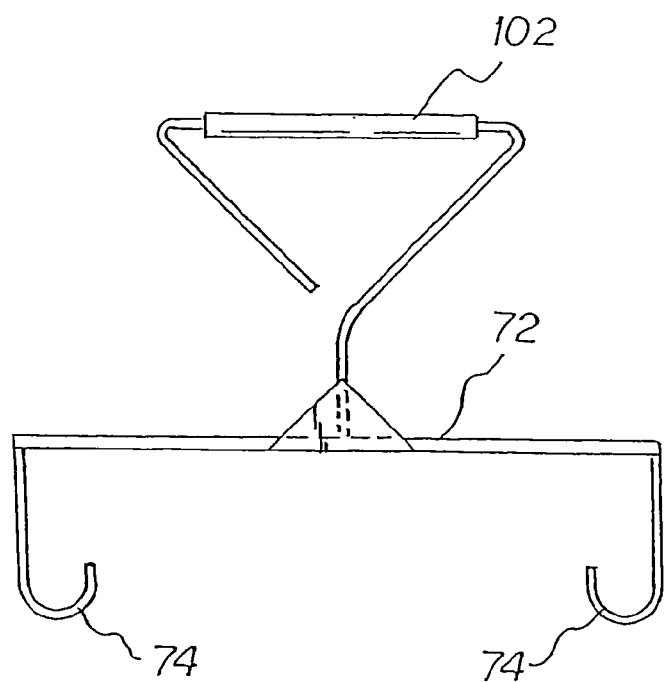
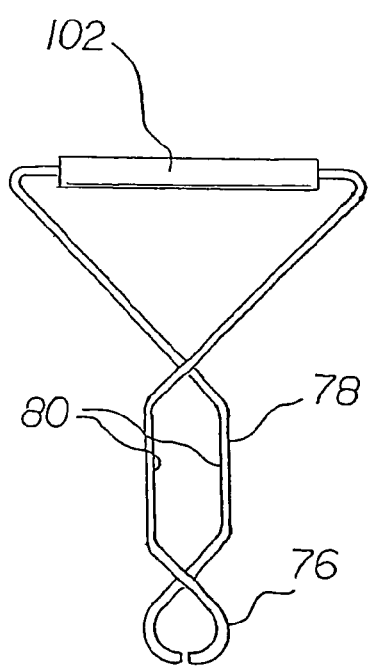
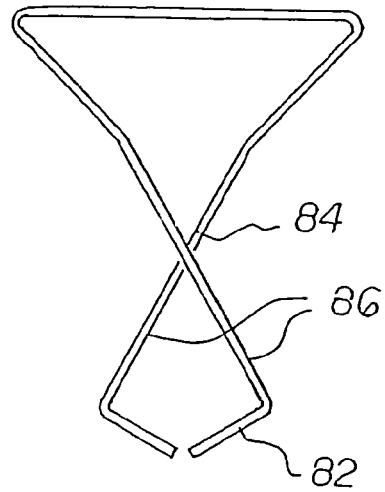
FIG 9
FIG 10
FIG 11

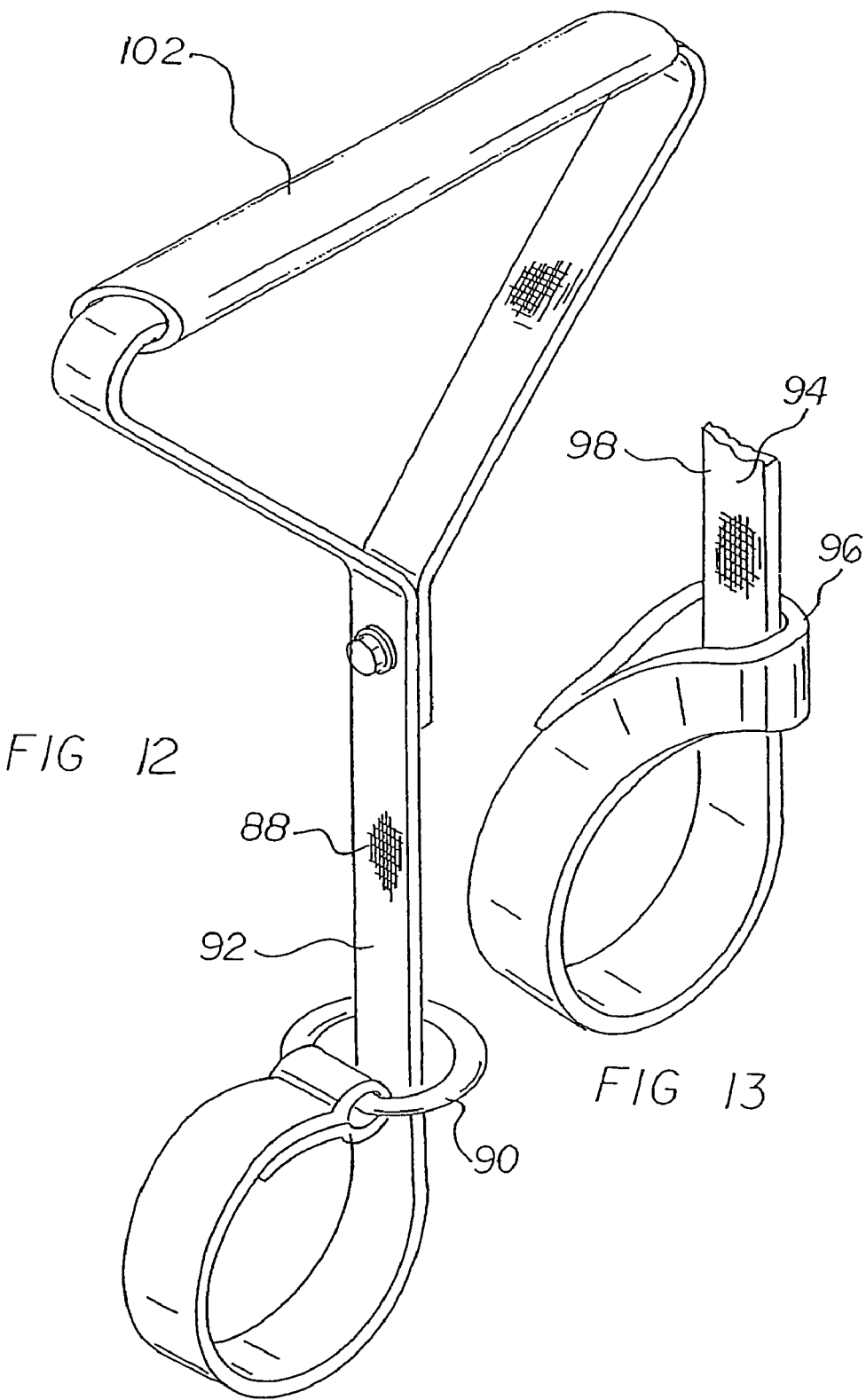

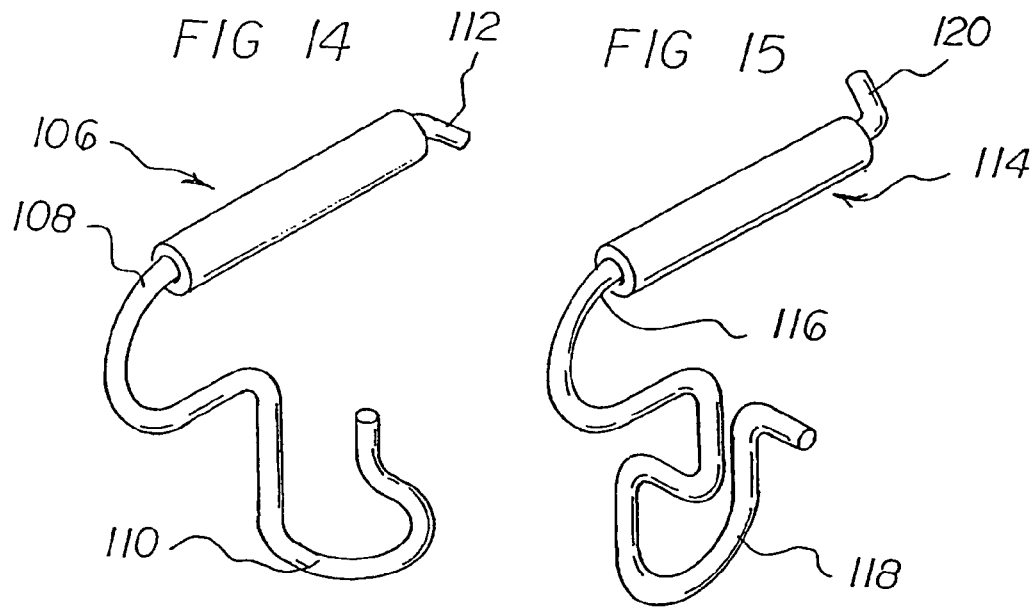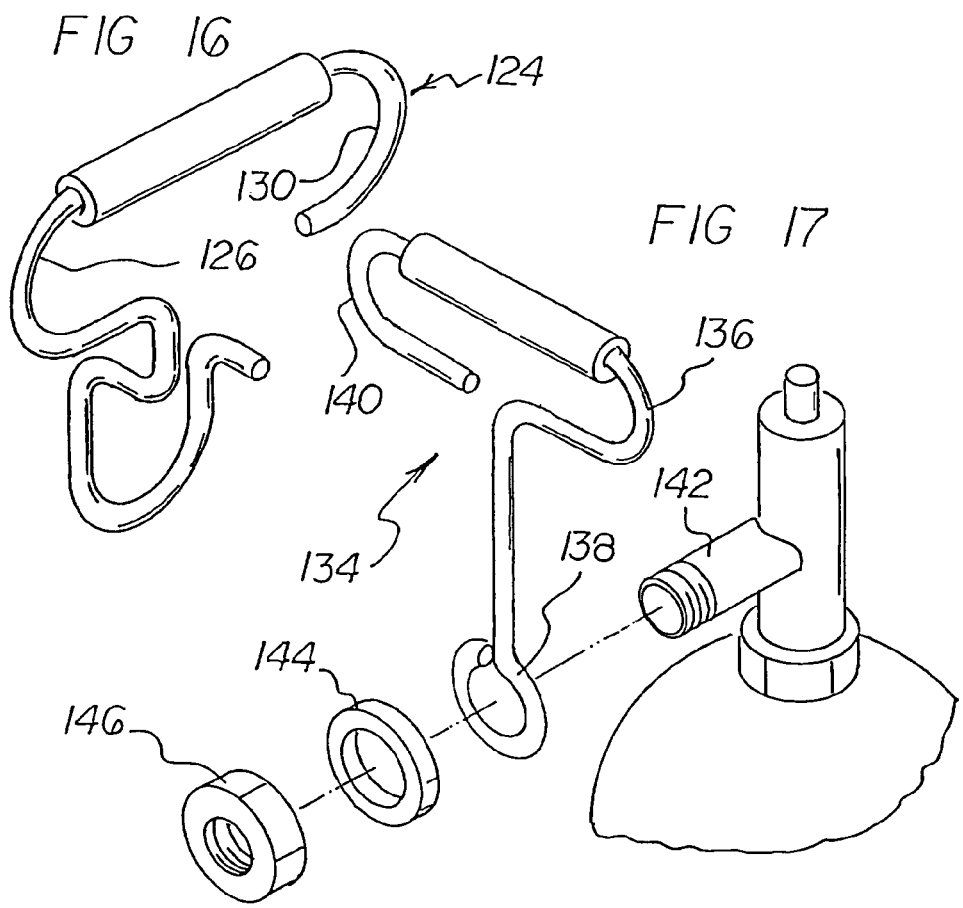

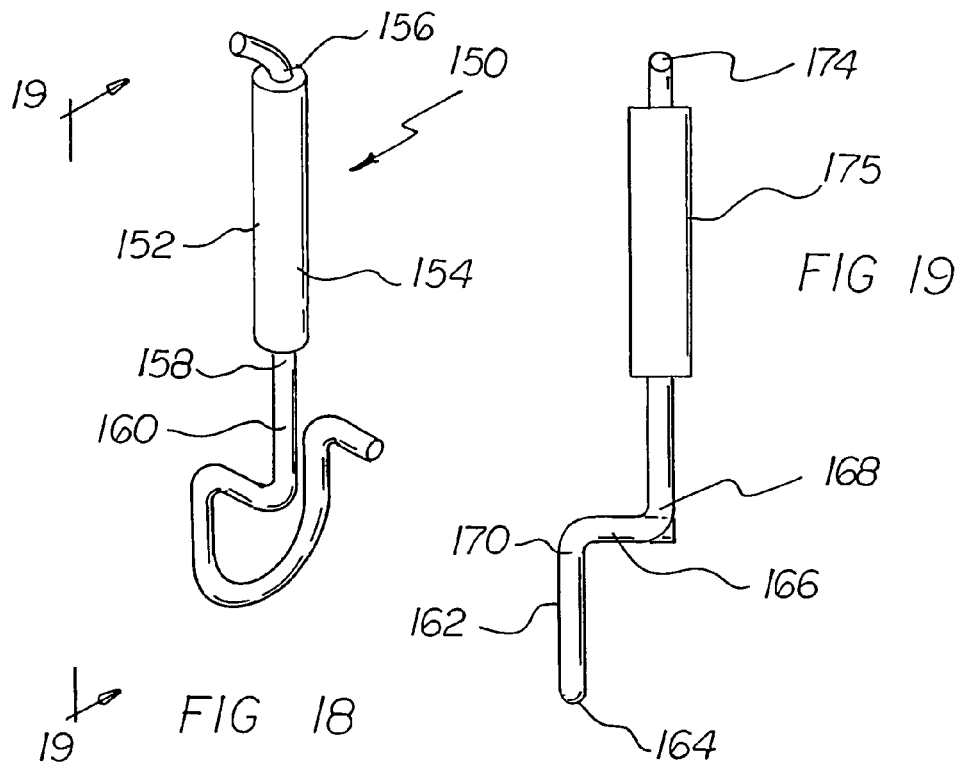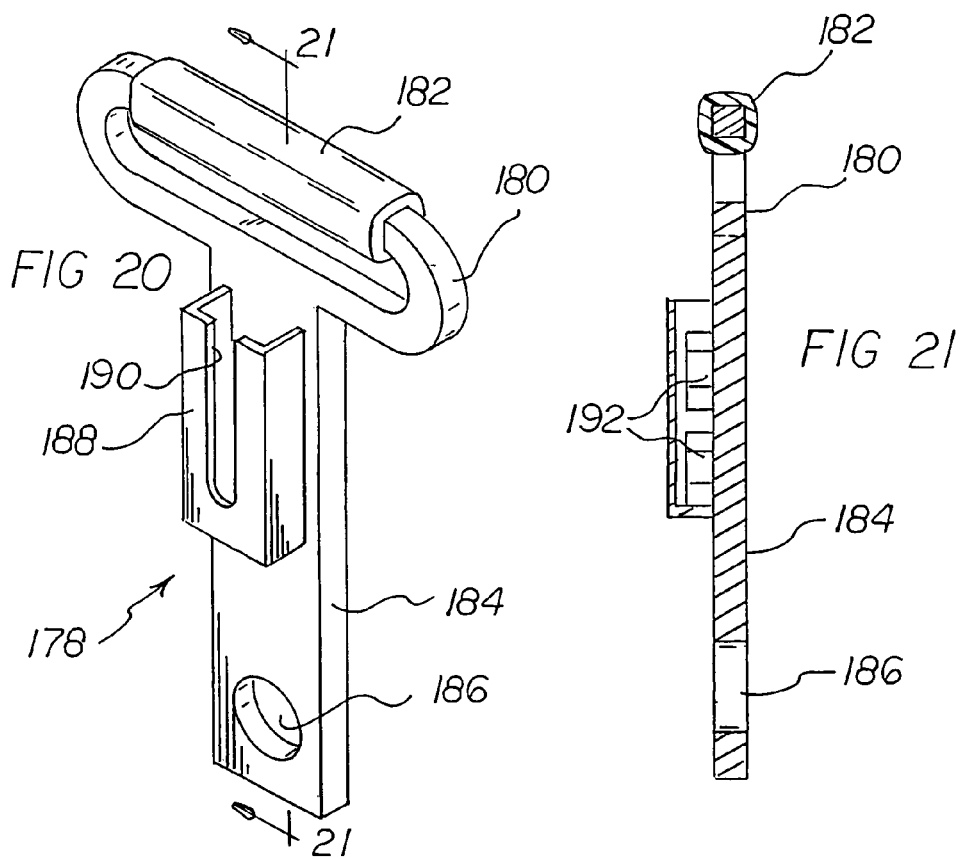

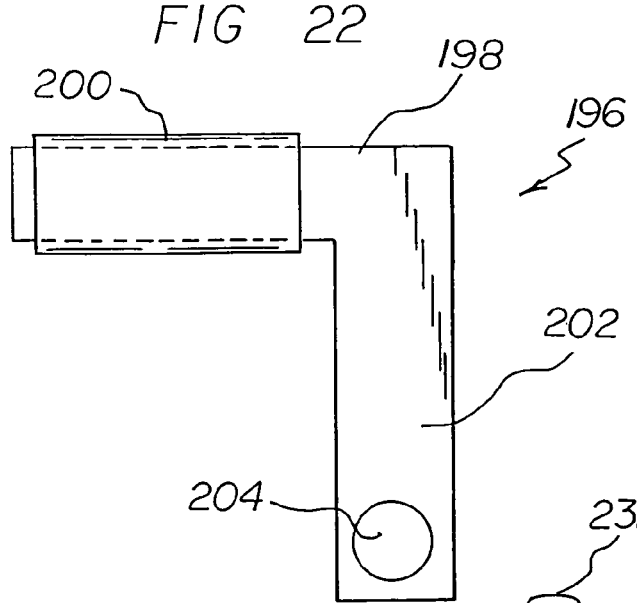
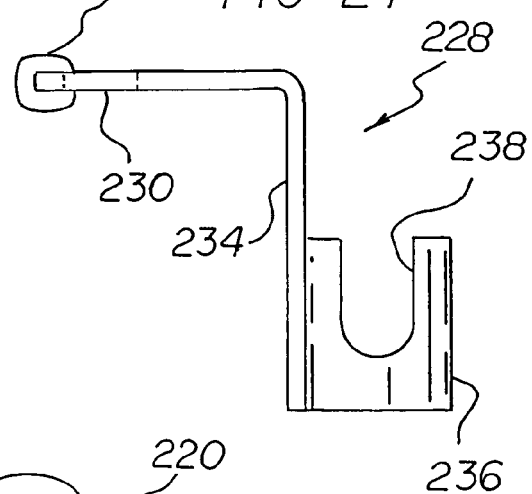
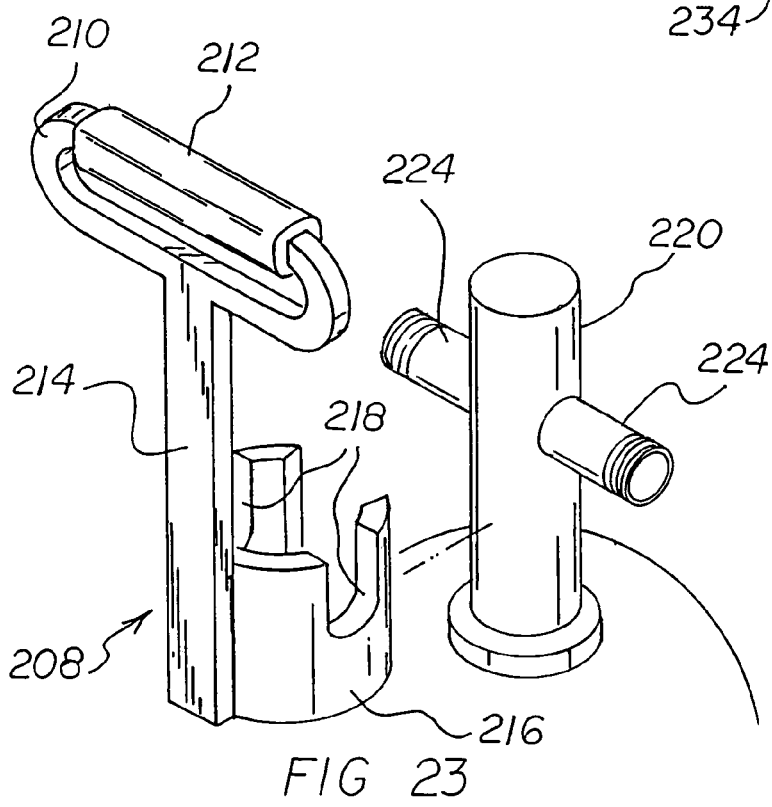

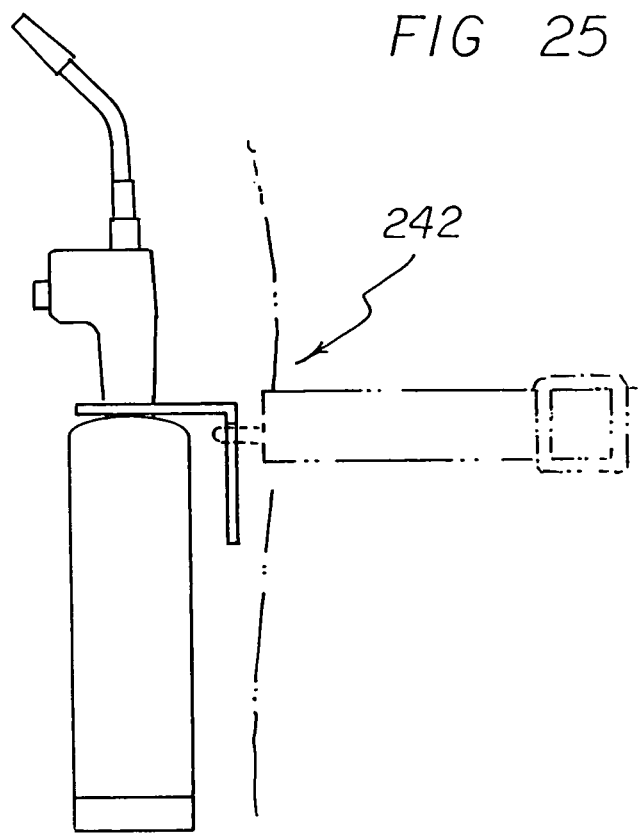
FIG 25
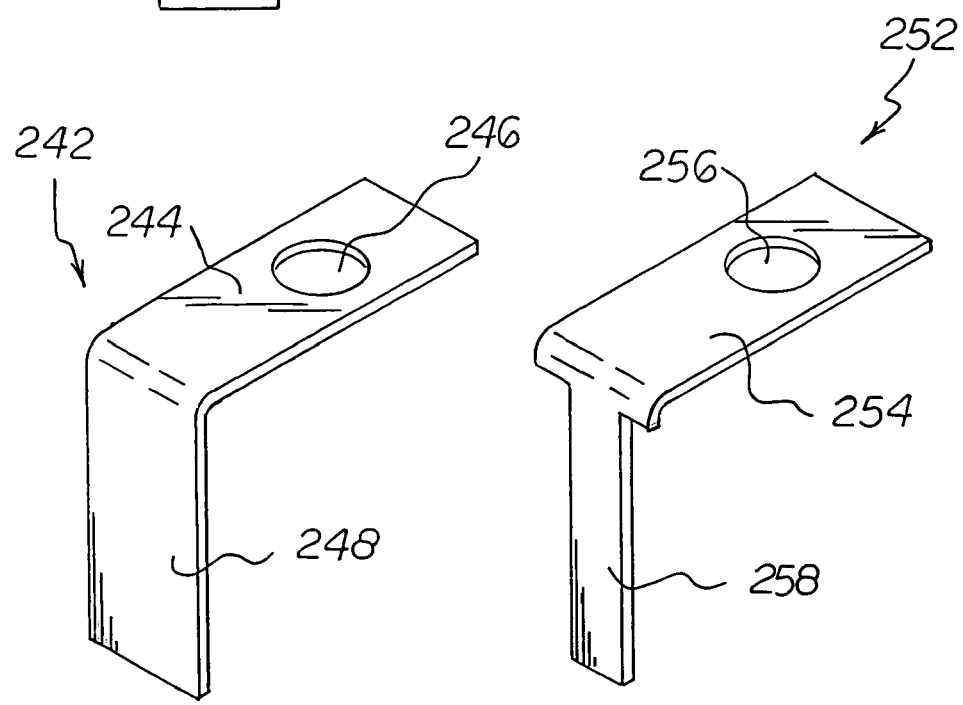
FIG 26
FIG 27

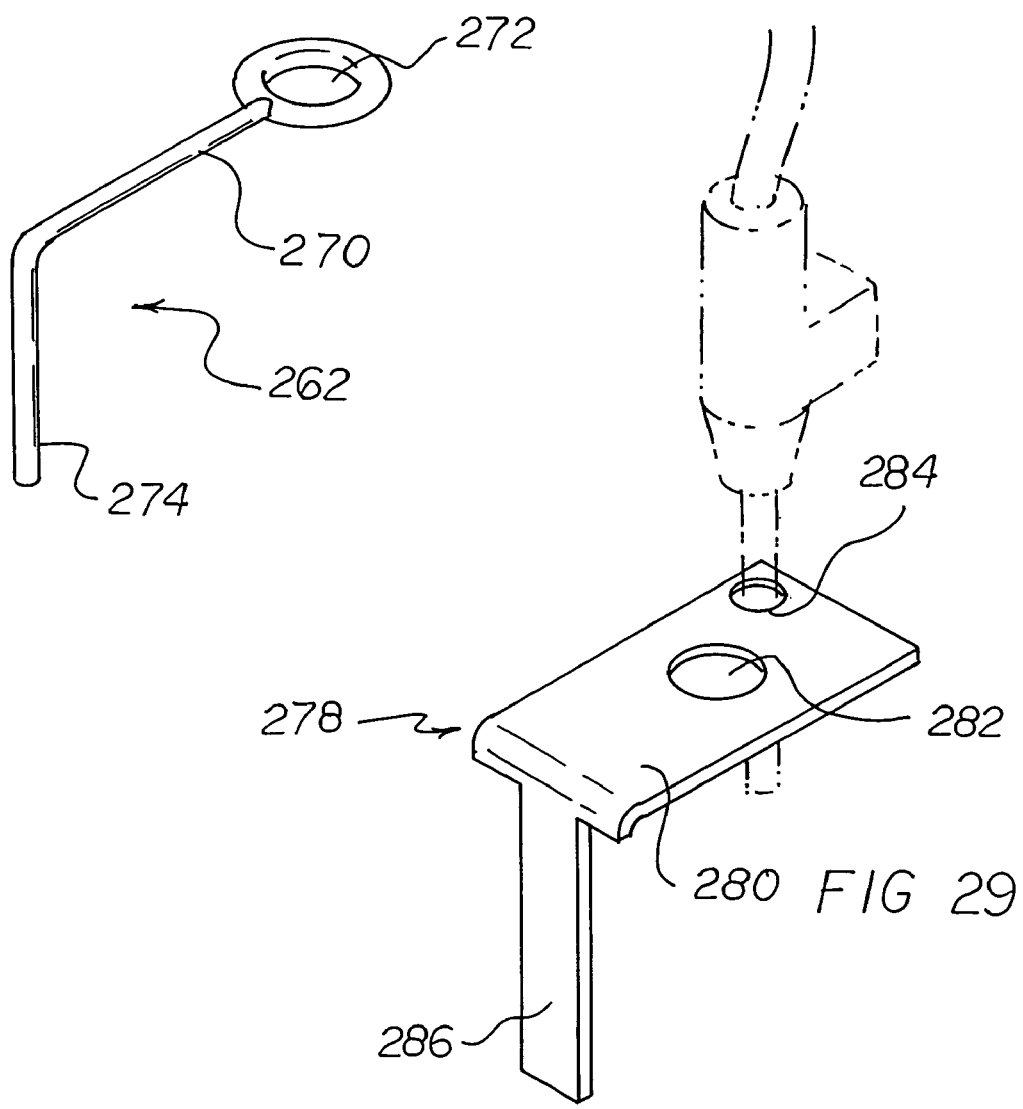

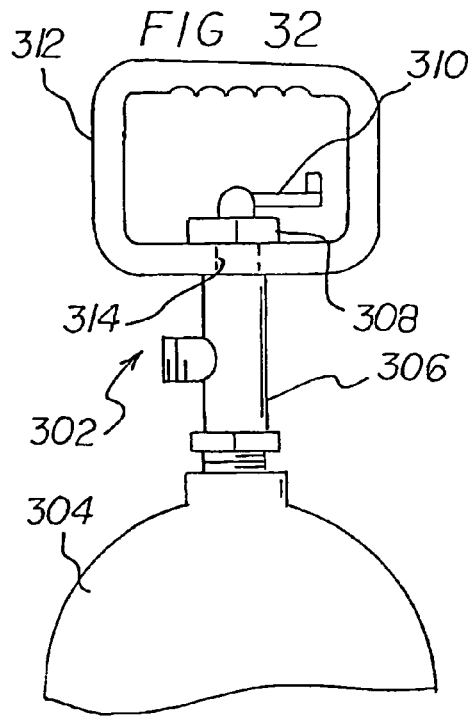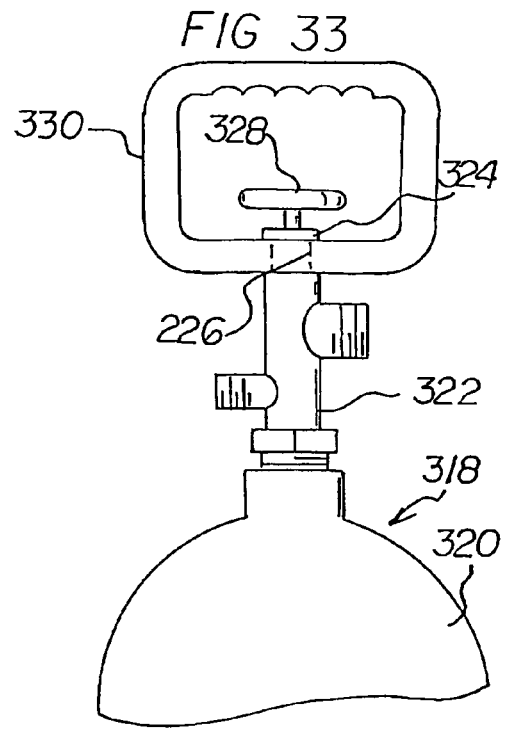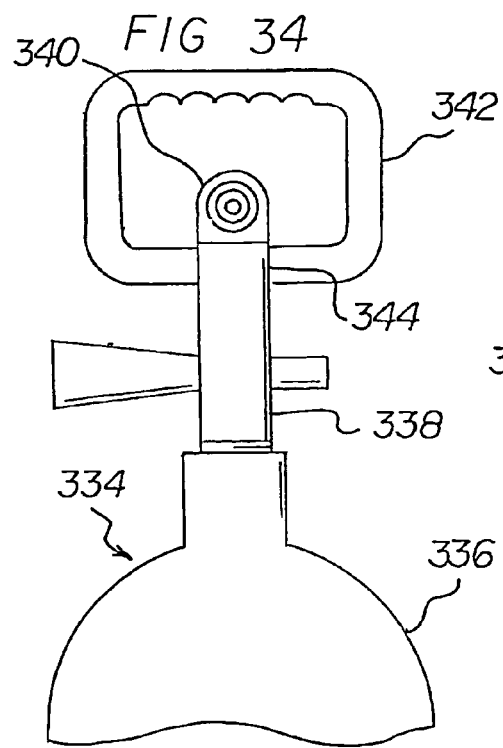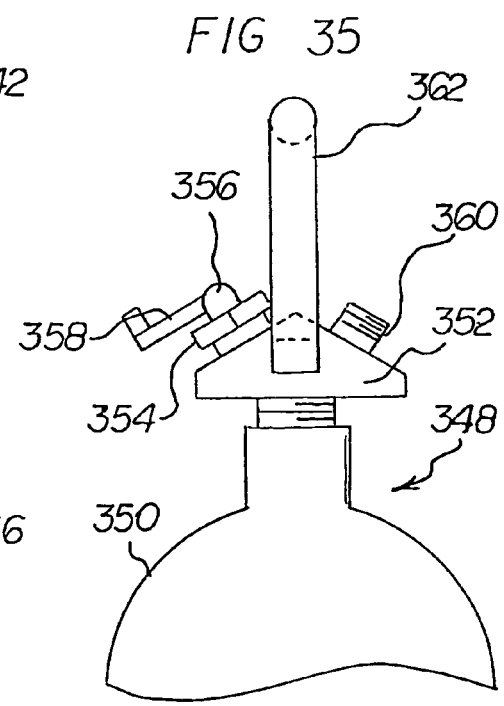

ly,
pertains to conveniently lifting and transporting a propane
TANK HANDLE SYSTEM

RELATED PATENT APPLICATIONS

This application is based upon U.S. Provisional Applications 60/553,079 filed Mar. 13, 2004; 60/576,494 filed Jun. 3, 2004; 60/580,980 filed Jun. 17, 2004; 60/584,724 filed Jul. 1, 2004; 60/588,915 filed Jul. 17, 2004; and 60/618,347 filed Oct. 12, 2004. In addition, this application is based upon Disclosure Document #548565 dated Mar. 12, 2004 entitled "Tank Handle Hook"; Disclosure Document #549609 dated Mar. 19, 2004 entitled "Tank Handle Hook, Hose, Facemask, Nasal Cannula all-in-one organizing tool"; Disclosure Document #556523 dated Jul. 6, 2004 entitled "Tank Handle and Valve Stem"; and Disclosure Document #557247 dated Jul. 19, 2004 entitled "Regulator With Handle". The subject matter of such provisional applications and disclosure documents is incorporated herein by reference.

BACKGROUND OF THE INVENTION

1. Field of the Invention

The present invention relates to a tank handle system, also known as a tank handle hook system, and more particularly pertains to conveniently lifting and transporting a propane tank and a scuba tank and an oxy-acetylene tank and a wide variety of other tanks of the type having a cylindrical neck in a horizontal orientation at an upper region.

2. Description of the Prior Art

The use of container lifters of known designs and configurations is known in the prior art. More specifically, container lifters of known designs and configurations previously devised and utilized for the purpose of lifting containers through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 1,563,000 issued Nov. 24, 1925 to Wajer relates to a lifting handle. U.S. Pat. No. 6,213,529 issued Apr. 10, 2001 to Kurcz relates to a propane tank and accessory carrier. Lastly, U.S. Pat. No. 6,536,820 issued Mar. 25, 2003 to Dean relates to a handle assembly for bulk fluid containers.

While these devices fulfill their respective, particular objectives and requirements, the aforementioned patents do not describe a tank handle hook system that allows conveniently lifting and transporting a propane tank and a scuba tank and an oxy-acetylene tank and a wide variety of other tanks of the type having a cylindrical neck in a horizontal orientation at an upper region.

In this respect, the tank handle hook system according to the present invention substantially departs from the conventional concepts and designs of the prior art, and in doing so provides an apparatus primarily developed for the purpose of conveniently lifting and transporting a propane tank and a scuba tank and an oxy-acetylene tank and a wide variety of other tanks of the type having a cylindrical neck in a horizontal orientation at an upper region.

Therefore, it can be appreciated that there exists a continuing need for a new and improved tank handle hook system which can be used for conveniently lifting and transporting a propane tank and a scuba tank and an oxy-acetylene tank and a wide variety of other tanks of the type having a cylindrical neck in a horizontal orientation at an upper region. In this regard, the present invention, including the various embodiments of the invention as set forth within this disclosure, substantially fulfills this need.

SUMMARY OF THE INVENTION

In view of the foregoing disadvantages inherent in the known types of container lifters of known designs and configurations now present in the prior art, the present invention provides an improved tank handle hook system. As such, the general purpose of the present invention, which will be described subsequently in greater detail, is to provide a new and improved tank handle hook system and method which has all the advantages of the prior art and none of the disadvantages.

To attain this, the present invention essentially comprises an upper section. The upper section has a laterally extending horizontal upper portion. The horizontal upper portion is adapted to be held by a user during operation and use. The horizontal upper portion has opposed ends and downwardly angled portions. The downwardly angled portions extend from the opposed ends at equal and opposite angles of about 45 degrees. One of the angled portions terminates at a free first end. The other angled portion terminates in a second end. The upper portion and angled portions are in a common vertical plane during operation and use. The upper portion has a length of about seven inches plus or minus ten percent.

Also provided is a lower section. The lower section has a semi-circular lower portion. He semi-circular lower portion is adapted to receive a cylindrical neck of a tank to be lifted and transported during operation and use. The lower portion has laterally spaced ends and linearly extending parallel portions. The linearly extending parallel portions extend upwardly from the laterally spaced ends. One of the laterally extending parallel portions terminates in a free first end. The other laterally extending parallel portion terminates in a second end. The lower portion and linearly extending parallel portions are in a common vertical plane. The lower portion has an interior radius of curvature of about 1.250 inches plus or minus ten percent.

Provided last is a central section. The central section ha a linear connecting portion. The linear connecting portion has an upper end formed integrally with the second end of the upper section. The linear connecting portion has a lower end formed integrally with the second end of the lower section. The middle section is in a vertical plane coextensive with the vertical plane of the upper section and the vertical plane of the lower section during operation and use. The upper, lower and central sections are fabricated of stainless steel, or other equivalent relatively rigid material, preferably metal. The upper, lower and central sections have a circular cross section with a diameter of about 0.125 inches plus or minus 10 percent. The entire system has an overall vertical height during operation ad use of about 7.750 inches plus or minus ten percent.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tank handle hook system which has all of the advantages of the prior art container lifters of known designs and configurations and none of the disadvantages.

It is another object of the present invention to provide a new and improved tank handle hook system which may be easily and efficiently manufactured and marketed.

It is further object of the present invention to provide a new and improved tank handle hook system which is of durable and reliable constructions.

An even further object of the present invention is to provide a new and improved tank handle hook system which is susceptible of a low cost of manufacture with regard to both materials and labor, and which accordingly is then susceptible of low prices of sale to the consuming public, thereby making such tank handle hook system economically available to the buying public.

Even still another object of the present invention is to provide a tank handle hook system for conveniently lifting and transporting a propane tank and a scuba tank and an oxy-acetylene tank and a wide variety of other tanks of the type having a cylindrical neck in a horizontal orientation at an upper region.

Lastly, it is an object of the present invention to provide a new and improved tank handle hook system. An upper section has a generally linear upper portion. The upper portion is adapted to be held by a user. The upper portion has opposed ends and a downward portion. The downward portion extend from one opposed end. The upper portion and downward portion are in a common vertical plane during operation and use. A lower section has a lower portion. The lower portion is adapted to receive a cylindrical neck of a tank to be lifted and transported. The lower portion is in a plane during operation and use. A central section has a connecting portion. The connecting portion has an upper end and a lower end. The upper end is formed integral with the upper section. The lower end is formed integrally with the lower section.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the present invention along with a plurality of various alternate embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 3, 4 and 5 are perspective illustrations of alternate embodiments of the invention.

FIGS. 6, 7 and 8 are front elevational views of tank handle hook systems illustrating additional alternate embodiments of the invention.

FIG. 9 is a front elevational view of a tank handle hook system for handling two tanks.

FIGS. 10 and 11 are front elevational views of a tank handle hook systems requiring pressure to open the systems.

FIGS. 12 and 13 are perspective illustrations of alternate embodiments of the invention fabricated from flexible materials.

FIGS. 14, 15 and 16 are perspective illustrations of additional alternate embodiments of the invention with a shortened downward portion.

FIG. 17 is a perspective illustrations of yet another alternate embodiments of the invention with the lower section formed as a circle.

FIG. 18 is a perspective illustration of the final alternate embodiment of the invention.

FIG. 19 is a front elevational view of the embodiment shown in FIG. 18.

FIG. 20 is a perspective illustration of another alternate embodiment of the invention.

FIG. 21 is a cross sectional view taken along line 21-21 of FIG. 20.

FIG. 22 is a front elevational view of another alternate embodiment of the invention.

FIG. 23 is a perspective illustration of another alternate embodiment of the invention.

FIG. 24 is a side elevational view taken along line 24-14 of FIG. 23.

FIG. 25 is a side elevational view of another alternate embodiment of the invention.

FIG. 26 is a perspective illustration of the embodiment of FIG. 25.

FIG. 27 is a perspective illustration of another embodiment of the invention.

FIG. 28 is a perspective illustration of another embodiment of the invention.

FIG. 29 is a perspective illustration of another embodiment of the invention.

FIGS. 32, 33 and 34 are front elevational views of alternate embodiments of the invention.

FIG. 35 is a side elevational view of an alternate embodiment of the invention.

The same reference numerals refer to the same parts throughout the various Figures of the various embodiments of the invention.

DESCRIPTION OF THE PREFERRED EMBODIMENT

Figure 1:
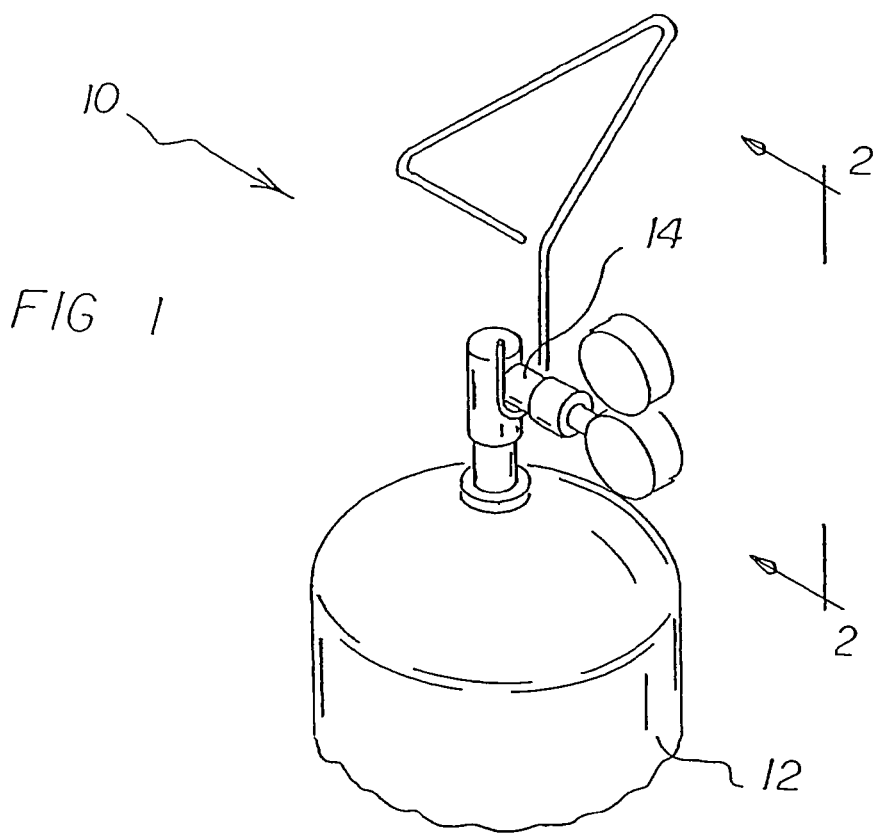
FIG. 1 is a perspective illustration of the top portion of a tank with a tank handle hook system constructed in accordance with the principles of the present invention.
Figure 2:
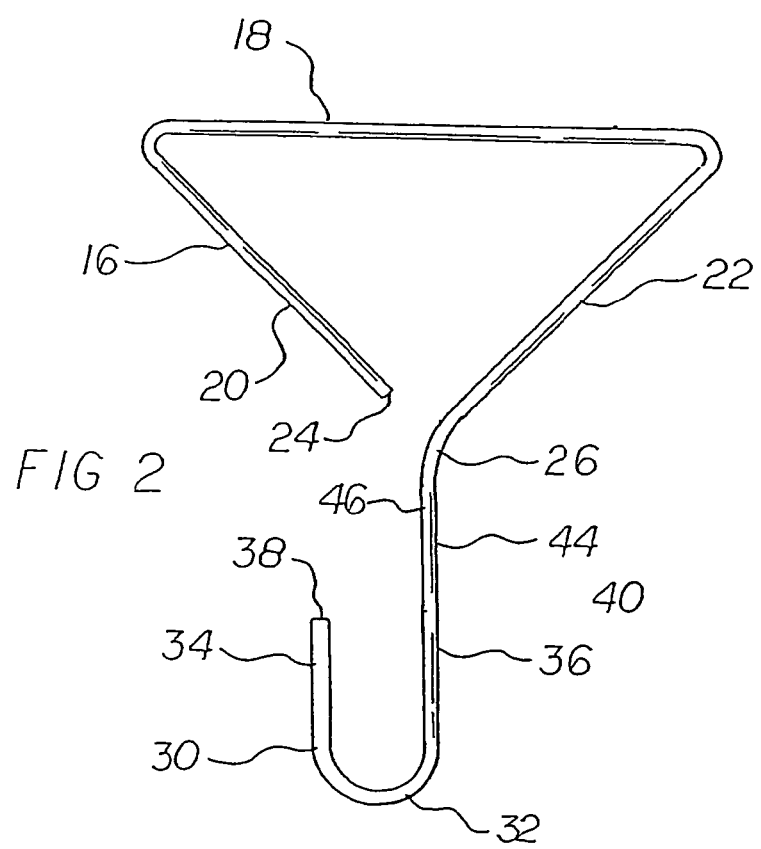
FIG. 2 is a front elevational view of the tank handle hook system taken at line 2-2 of FIG. 1.

With reference now to the drawings, and in particular to FIG. 1 thereof, the preferred embodiment of the new and improved tank handle hook system embodying the principles and concepts of the present invention and generally designated by the reference numeral 10 will be described.

The present invention, the tank handle hook system 10 is comprised of a plurality of components. Such components in their broadest context include an upper section, a lower section and a central section. Such components are individually configured and correlated with respect to each other so as to attain the desired objective.

First provided is an upper section 16. Such upper section includes a regulator with a gauge 14. The upper section has a laterally extending and generally linear horizontal upper portion 18. The horizontal upper portion is adapted to be held by a user during operation and use. The horizontal upper portion has opposed ends and downwardly angled portions 20, 22. The downwardly angled portions extend from the opposed ends at equal and opposite angles of about 45 degrees. One of the angled portions terminates at a free first end 24. The other angled portion terminates in a second end 26. The upper portion and angled portions are in a common vertical plane during operation and use. The upper portion has a length of about seven inches plus or minus ten percent.

Also provided is a lower section 30. The lower section has a semi-circular lower portion 32. He semi-circular lower portion is adapted to receive a cylindrical neck of a tank to be lifted and transported during operation and use. The lower portion has laterally spaced ends and linearly extending parallel portions 34, 36. The linearly extending parallel portions extend upwardly from the laterally spaced ends. One of the laterally extending parallel portions terminates in a free first end 38. The other laterally extending parallel portion terminates in a second end 40. The lower portion and linearly extending parallel portions are in a common vertical plane. The lower portion has an interior radius of curvature of about 1.250 inches plus or minus ten percent.

Provided last is a central section 44. The central section ha a linear connecting portion 46. The linear connecting portion has an upper end formed integrally with the second end of the upper section. The linear connecting portion has a lower end formed integrally with the second end of the lower section. The middle section is in a vertical plane coextensive with the vertical plane of the upper section and the vertical plane of the lower section during operation and use. The upper, lower and central sections are fabricated of stainless steel, or other equivalent relatively rigid material, preferably metal. The upper, lower and central sections have a circular cross section with a diameter of about 0.125 inches plus or minus 10 percent. The entire system has an overall vertical height during operation ad use of about 7.750 inches plus or minus ten percent.

In the first alternate embodiment of the present invention, the system is as set forth above but the vertical plane of the upper section 50, with respect to the vertical plane of the lower section 52, is rotated about a vertical axis extending through the central section 54 and the vertical planes of the upper and lower sections. Note the embodiment shown in FIG. 3.

In the second alternate embodiment of the present invention, the system is as set forth above but the central section 56 is at an angle with respect to the lower section and upper section to position the center of curvature of the lower section essentially vertically aligned beneath the center of the upper section during operation and use. Note the embodiment shown in FIG. 4.

In the third alternate embodiment of the present invention, the vertical plane of the upper section 58, with respect to the vertical plane of the lower section 60, is rotated about a vertical axis. The vertical axis extends through the central section 62, the vertical planes of the upper and lower sections and the central section 62. The central section is at an angle with respect to the lower section and upper section. Note the embodiment shown in FIG. 5.

In the fourth alternate embodiment of the present invention includes the upper section 64 in a rectangular configuration. The lower section 66 is in a V-shaped configuration. Note the embodiment shown in FIG. 6.

In the fifth alternate embodiment of the present invention the lower section is formed of two concentric wires 68. The wires of a relatively rigid material. Note the embodiment shown in FIG. 7.

In the sixth alternate embodiment of the present invention the upper section 70 is essentially circular. Note the embodiment shown in FIG. 8.

In the seventh alternate embodiment of the present the lower section 72 includes two laterally spaced hooks 74. Each hook is adapted to lift and transport a tank. Note the embodiment shown in FIG. 9.

In the eighth alternate embodiment of the present invention, the lower section 76 and middle section 78 are formed of two laterally spaces wire components 80. The wire components cross at two points and are spring biassed. In this manner a tank is held while the wire components of the middle section are adapted to be squeezed together to release a held tank. Note the embodiment shown in FIG. 10.

In the ninth alternate embodiment of the present invention, the lower section 82 and middle section 84 are formed of two laterally spaces wire components 86. The wire components cross at one point and are spring biassed. In this manner a tank is held while the wire components are adapted to be extended apart to release a held tank. Note the embodiment shown in FIG. 11.

In the tenth alternate embodiment of the present invention the upper and lower and central sections are fabricated of a common flexible strap material 88. A ring 90 is provided at the end of the lower section. The ring receives the lower end of the central section 92. In this manner a loop is formed. The loop is adapted to receive a cylindrical neck of a tank to be lifted and transported. A bolt couples the free end of the upper section to the central section. Note the embodiment shown in FIG. 12.

In the eleventh alternate embodiment of the present invention, the upper, lower and central sections are fabricated of a common flexible strap material 94. The flexible strap material forms a first loop 96 at the end of the lower section. The loop receives the lower end of the central section 98. In this manner a loop is formed. The loop is adapted to receive a cylindrical neck of a tank to be lifted and transported. Note the embodiment shown in FIG. 13.

In the twelfth alternate embodiment of the present invention, the laterally extending upper portion includes a generally cylindrical member 102. The cylindrical provides for the comfort of a user lifting and transporting a tank with the system. Note the embodiment shown in FIG. 3.

FIGS. 14, 15 and 16 are perspective illustrations of additional alternate embodiment of the invention with a shortened downward portion. The system 106 of FIG. 14 has the vertical plane of the upper section 108 at 90 degrees from the plane of the lower section 110 which is horizontal. The shortened downward portion 110 is in a vertical plane. The system 114 of FIG. 15 has the vertical plane of the upper section 116 parallel with, but offset from, the plane of the lower section 118 which is vertical. The shortened downward portion 120 is in a horizontal plane. The system 124 of FIG. 16 has the vertical plane of the upper section 126 parallel with, but offset from, the plane of the lower section 128 which is vertical. The shortened downward portion 130 is in a vertical plane. In the embodiment of FIG. 17, the system 134 has the vertical plane of the upper section 136 in the plane of the lower section 138 which is vertical. The shortened downward portion 140 is in the same vertical plane. In addition, the lower section formed as a circle adapted to receive a horizontal cylindrical threaded section 142 of a tank and held in place by a washer 144 and nut 146.

An additional alternate embodiment of the invention is illustrated in FIGS. 18 and 19. In such embodiment, the system 150 comprises an upper section 152 with a generally linear upper portion 154 adapted to be held by a user. The upper portion is adapted to be held vertically or essentially vertically during operation and use. The upper portion has opposed ends 156, 158 and a downward portion 160 extending from one opposed end, the lower end 158. The upper portion and downward portion are in a common essentially vertical plane during operation and use. The system also comprises a lower section 162 with a lower portion 164 adapted to receive a horizontally disposed cylindrical section of a neck of a tank to be lifted and transported. The lower portion is in a generally vertical plane during operation and use. Lastly, the system comprises a generally horizontally disposed central section 166 with a connecting portion having an upper end 168 formed integral with the upper section and a lower end 170 formed integral with the lower section. In order to provide greater comfort to a user of the system, a resilient grip 172 in a cylindrical configuration is slipped over the upper portion of the upper section. The upper end 156 of the upper portion is then formed with a bend 174 to retain the grip in a proper position. The preferred material for the grip is polyurethane foam.

In the embodiments of the present invention, except for the flexible embodiments of FIGS. 12 and 13, the upper, lower and central sections are fabricated of a relatively rigid material. The relatively rigid material is preferably in a circular cross section. The relatively rigid material has a preferable diameter of about 0.125 inches plus or minus 10 percent.

The system 178 of FIGS. 21 and 22 has an upper portion 180 which is generally oval with a hand grip 182. The lower portion 184 is linear with an aperture 186 for receiving a portion of the tank to be held. Further included is a box-like extension 188 on the lower portion beneath the upper portion and above the aperture. The box-like extension has an open top and a vertical slot 190 for the receipt of nuts 192 adapted to be used with tank to be held.

The system 196 of FIG. 22 has an upper portion 198 which is linear and generally horizontal and with a grip 200. The lower portion 202 is linear and generally vertical with an aperture 204 for receiving a portion of a tank to be held.

The system 208 is illustrated in FIG. 23. In such system the upper portion 210 is generally oval with a generally horizontal grip 212 to be held by a user. The lower portion 214 is linear and generally vertical with an tubular section 216. Such extension has downwardly extending slots 218 for receiving laterally extending portions 224 of a tank 220 to be held.

In FIG. 24, the system 228 has an upper portion 230 which is generally oval with a grip 232 to be held by a user. The lower portion 234 is linear and generally vertical with an tubular section 236 that has downwardly extending slots 238 for receiving laterally extending portions of a tank to be held, the upper and lower portions being at an angle, preferably 90 degrees, with respect to each other.

A tank handle hook system 242 is shown in FIGS. 25 and 26. Such system comprises a first section 244 with a generally linear portion 248 adapted to be supported by a user. The first portion has opposed ends and a portion extending from one opposed end. A second section 244 has a portion 246 adapted to receive a cylindrical neck of a tank to be lifted and transported. The second portion is in a plane during operation and use. A central section is a connecting portion having a first end formed integral with the first section and a second end formed integral with the second section.

FIGS. 25 and 26 show a system wherein the first and second sections have a common width.

FIG. 27 shows a system 252 wherein the first section 254 has a first width and an aperture 256 and the second sections 258 have a second width less than the first width.

FIG. 28 is a system 262 wherein the first and second sections 270, 274 have a common circular cross sectional configuration with a wire loop 272 at the end of the first section remote from the second section.

Next, the system 278 of FIG. 29 has a first section 282 with a first width and the second section 286 with a second width less than the first width. Two apertures 282, 284 are formed in the second section for holding a tank in one aperture 282 and an aperture 284 for holding a tool in the other aperture.

Figure 30:
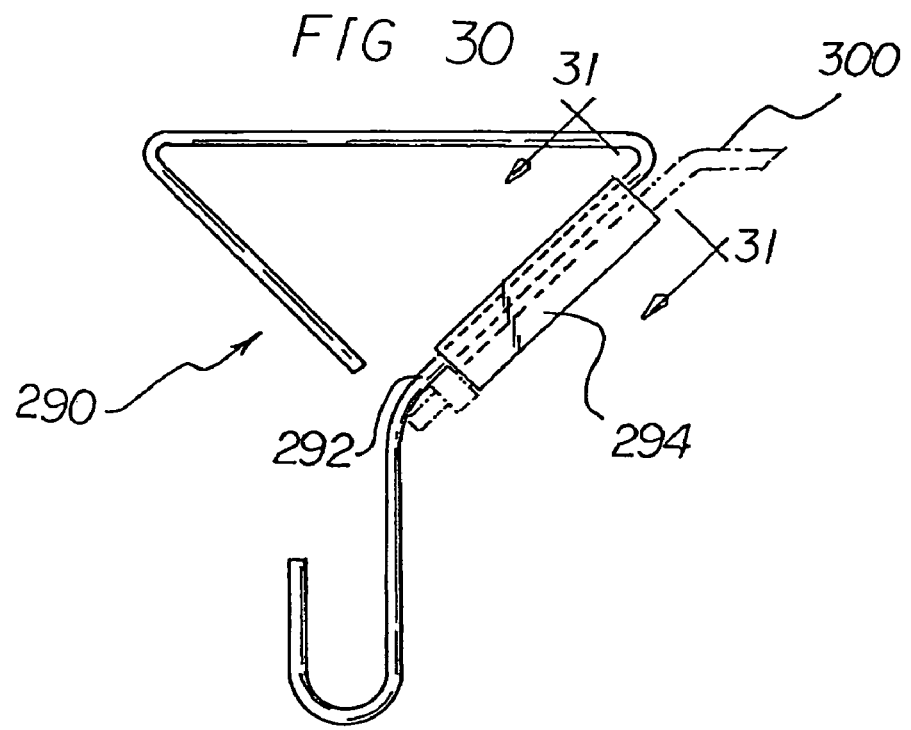
FIG. 30 a front elevational view of another embodiment of the invention.
Figure 31:
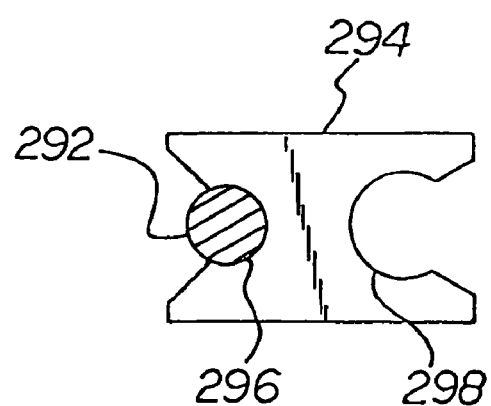
FIG. 31 is a cross sectional view taken along line 31-31 of FIG. 30.

The system 290 shown in FIGS. 30 and 31 includes a central section has a linear component 292 and further including a supplemental component 294. Such component is preferably fabricated of a plastic material with limited resilience and a common cross sectional configuration with parallel edges. The supplemental component has a C-shaped recess 296 along one edge for removable coupling the linear component and a parallel C-shaped recess 298 along the other edge for removable receiving a torch tip 300.

The system 302 of FIG. 32 is for coupling to a tank 304 of the type having an upstanding valve stem 306 with a packing nut 308 there above and with a swingable valve actuator 310 above the packing nut. In such embodiment, the first section and second section and central section are formed to create a handle 312 with an opening there through of sufficient size to allow the swinging of the valve actuator during operation and use, the second section of the handle being formed with an aperture 314 for the passage of a portion of the valve stem there through with the packing nut there above.

The system 318 shown in FIG. 33 is for coupling to a traditional nitro/carbon dioxide/oxygen tank 320 of the type having an upstanding valve stem 322 with a packing nut 324 there above and with a rotatable valve actuator 328 above the packing nut. In such embodiment, the first section and second section and central section are formed to create a handle 330 with an opening there through of sufficient size to allow the rotating of the valve actuator during operation and use. The second section of the handle is formed with an aperture 326 for the passage of a portion of the valve stem there through with the packing nut there above.

FIG. 34 illustrates a system 334 for coupling to a scuba tank 336 of the type having an upstanding valve stem 338 with a regulator 340 there above. The first section and second section and central section are formed to create a handle 342 with an opening there through of sufficient size to allow handling the regulator during operation and use. The second section of the handle is formed with an aperture 344 for the passage of a portion of the valve stem there through with the regulator there above.

The system 348 of FIG. 35 is for coupling to a tank 350 of the type having an upstanding valve stem with a triangular member 352 with two planar faces there above. The triangular member has a stem 356 and an actuator 358 on one face and threads 360 for coupling to a regulator hose on the other face. The first section and second section and central section are formed to create a handle 362 with an opening there through of sufficient size to allow handling the actuator during operation and use. The second section of the handle is formed with an aperture for the receipt of a portion of the valve stem with the triangular member there above. The system thereby surrounding at least part of the pressure regulation mechanism or flow regulation mechanism of the tank.

Figure 36:
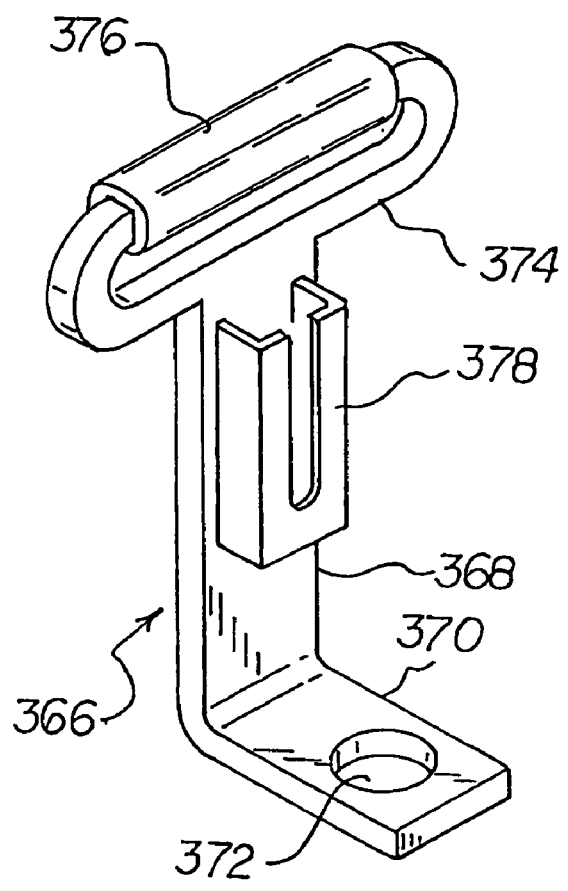
FIGS. 36 and 37 are perspective illustrations, taken from the left front side and from the right front side respectively, showing additional alternate embodiments of the present invention.

The system 366 shown in FIG. 36 includes a central section 368 which is vertically oriented. The second section 370 is horizontally oriented beneath the central section with an aperture 372 there through for receiving a portion of a tank. The upper section 374 is above the central section with a grip 376 for being grasped by a user. Further included is a box-like receptacle 378 on the side of the central section facing the aperture for removably receiving nuts and the like.

Figure 37:
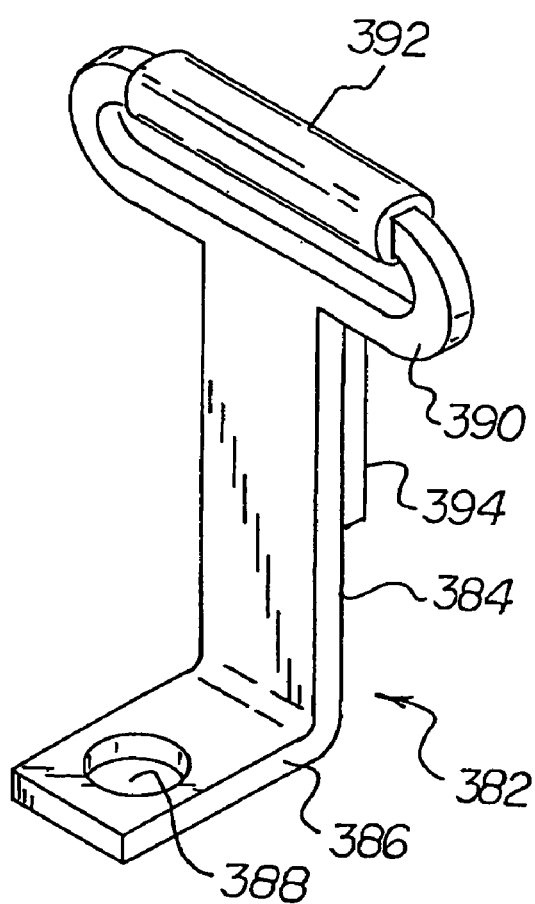

The system 382 shown in FIG. 37 includes a central section 384 is vertically oriented and the second section 386 is horizontally oriented beneath the central section with an aperture 388 there through for receiving a portion of a tank and the upper section 390 is above the central section with a grip 392 for being grasped by a user, and further including a box-like receptacle 394 on the side of the central section remote the aperture for removably receiving nuts and the like.

Figure 38:
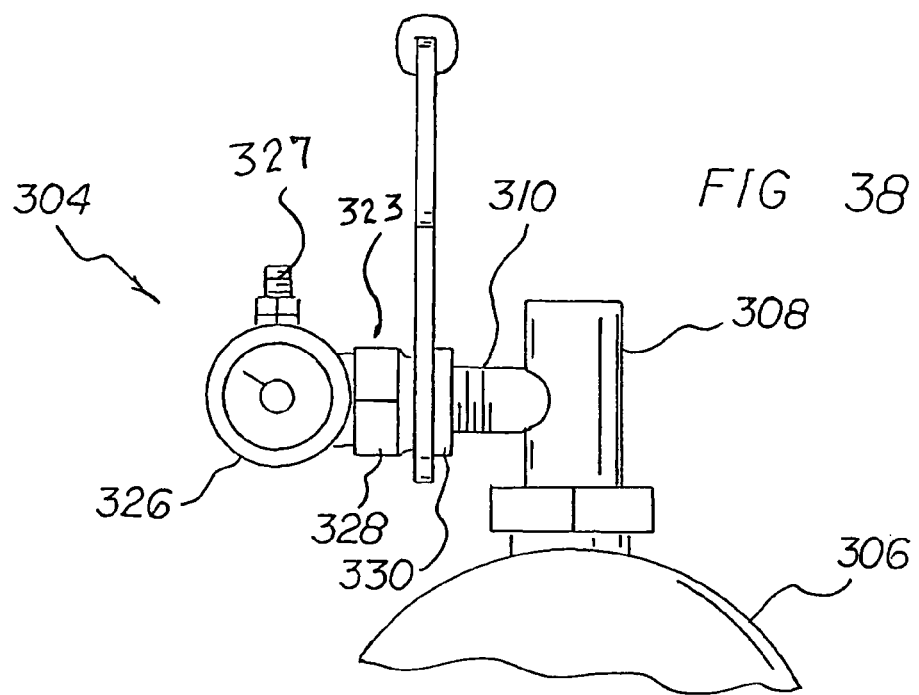
FIGS. 38 and 39 are a front elevational view and a perspective illustration of an additional alternate embodiment of the invention.
Figure 39:
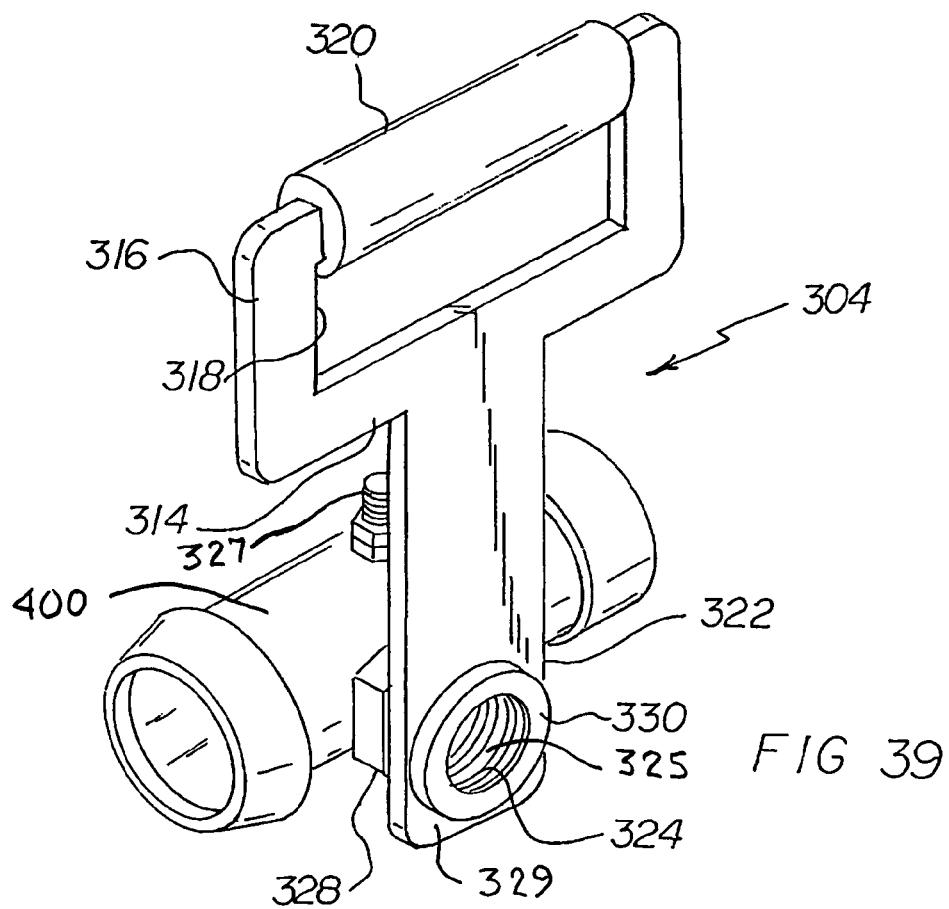

Another embodiment is shown in FIGS. 38 and 39. In such embodiment, the tank handle system 304 comprises a tank 306 having an upstanding vertical top 308 and a horizontal extension 310. The horizontal extension is formed with male screw threads. A handle 314 has an upper portion 316 with a rectangular first opening 318 which includes an aperture and a grip 320. The grip is configured to be held by a user. The handle also has a lower portion 322 with a circular second aperture which includes an aperture. The lower portion of the handle at least partially surrounding the pressure regulation mechanism and flow delivery mechanism. The lower portion of the handle 329 being solid and smooth. As shown in FIGS. 38 and 39, the lower portion of the handle 322 surrounds and encases part of the gas flow passageway 323 which comprises the regulator and valve. The gas flow passageway has an inflow 325 and an outflow 327. The surrounding of the pressure regulation mechanism and flow delivery mechanism thereby providing a means of lifting and carrying the tank. In association therewith is a cylindrical gauge 326 with a nut 328. The nut has a first end threadedly coupled with respect to the gauge and a second end 330. The second end is formed with internal female threads 324 coupled with respect to the extension of the tank and forms part of the gas passageway. The nut is rotatably supported at a central region by the aperture of the handle to allow coupling between the handle and gauge and nut.

In view of the above, it should be understood that the present invention may be utilized with any and all types of regulators, whether high or medium or low pressure, regulators operatively associated with the tank handle technology of the present invention along with a coupling nut. As such, the present invention includes handles, gas regulators with handles, nuts, nuts with handles, and the like.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tank handle system comprising:
a tank handle having an upper portion with a first rectangular opening forming a first aperture and a grip configured to be held by a user, the handle also having a second aperture, the handle having a generally flat configuration, with the first aperture and second aperture lying in a common plane;
a gas passageway coupled to a tank, the gas passageway having an end with a threaded end; and
a nut coupled to and at least partially contained within the second aperture of the handle, the nut having a first end and a second end, the second end having a thread with the thread connecting the nut and the threaded end of the gas passageway, the first end of the nut also being threaded and the first end of the nut being threadedly coupled to a gas pressure regulator.

2. A tank handle system for use with a tank having an upstanding vertical top, the system including:
a handle having an upper portion having a first aperture with a grip configured to be held by a user, the handle also having a generally flat lower portion with a circular second aperture therethrough, the circular aperture lying in a common plane with the first aperture and generally parallel thereto, with the lower portion being smooth;
a nut coupled to the second aperture with the nut having a threaded first end and a threaded second end;
a gas flow passageway coupling the tank and attaching to the second end of the nut, the lower portion of the handle at least partially surrounding the gas flow passageway thereby providing a means of lifting and carrying the tank.

3. A tank handle system for use with a tank having an upstanding vertical top, the system including:
a handle having an upper portion having a first aperture with a grip configured to be held by a user, the handle also having a generally flat lower portion with a circular second aperture therethrough, the circular aperture lying in a common plane with the first aperture and generally parallel thereto, with the lower portion being smooth, the first aperture and second aperture lying in a common plane being a first plane;
a nut having a first end and a second end, the nut having a threaded passageway there through, the nut being coupled to and substantially contained within the second aperture of the handle, the nut being oriented with the threaded passageway being located within the first plane and in a plane generally parallel with the plane of the first aperture and second aperture;

a gas flow passageway coupling the tank and attaching to the second end of the nut, the lower portion of the handle at least partially surrounding the gas flow passageway thereby providing a means of lifting and carrying the tank, the second end of the nut being attached to a pressure regulator.

* * * * *